(12) United States Patent
Takagi et al.

(10) Patent No.: US 8,074,074 B2
(45) Date of Patent: Dec. 6, 2011

(54) COMPRESSED DATA SCRAMBLED DISTRIBUTION DEVICE AND PLAYBACK DEVICE THEREOF

(75) Inventors: Koichi Takagi, Fujimino (JP); Shigeyuki Sakazawa, Fujimino (JP); Yasuhiro Takishima, Fujimino (JP)

(73) Assignee: KDDI Corporation, Tokyo (JP)

( * ) Notice: Subject to any disclaimer, the term of this patent is extended or adjusted under 35 U.S.C. 154(b) by 1087 days.

(21) Appl. No.: 11/373,333

(22) Filed: Mar. 13, 2006

(65) Prior Publication Data

US 2006/0224896 A1 Oct. 5, 2006

(30) Foreign Application Priority Data

Mar. 29, 2005 (JP) ................................. 2005-094489

(51) Int. Cl.
*H04L 9/32* (2006.01)
*H04L 9/34* (2006.01)

(52) U.S. Cl. ........ 713/176; 713/169; 713/193; 380/210; 380/200; 380/268; 382/100; 382/232; 382/235; 725/31; 725/25

(58) Field of Classification Search ........................ None
See application file for complete search history.

(56) References Cited

U.S. PATENT DOCUMENTS

| | | | |
|---|---|---|---|
| 5,499,293 A * | 3/1996 | Behram et al. ................. 705/76 |
| 5,574,785 A | 11/1996 | Ueno et al. | |
| 6,005,936 A | 12/1999 | Shimizu et al. | |
| 6,584,200 B1 * | 6/2003 | Tanaka .......................... 380/216 |
| 6,944,296 B1 * | 9/2005 | Liu et al. ....................... 380/201 |
| 6,993,133 B1 * | 1/2006 | Nonomura et al. ............ 380/252 |
| 7,876,896 B2 | 1/2011 | Alkove et al. | |
| 7,904,301 B2 * | 3/2011 | Densham et al. .............. 704/500 |
| 7,941,671 B2 | 5/2011 | Wong | |
| 7,991,183 B2 * | 8/2011 | Sakazawa et al. ............. 382/100 |
| 2003/0061500 A1 * | 3/2003 | Mimura et al. ................ 713/193 |
| 2003/0126445 A1 * | 7/2003 | Wehrenberg ................... 713/176 |
| 2005/0105728 A1 * | 5/2005 | Yamaoka et al. .............. 380/202 |
| 2006/0123319 A1 * | 6/2006 | Kojima et al. ................. 714/758 |
| 2006/0143018 A1 * | 6/2006 | Densham et al. .............. 704/500 |
| 2009/0132825 A1 * | 5/2009 | Mohanty ........................ 713/176 |

FOREIGN PATENT DOCUMENTS

| | | |
|---|---|---|
| JP | 7-327029 A | 12/1995 |
| JP | 10-164549 A | 6/1998 |
| JP | 2001-078007 A | 3/2001 |
| JP | 2002-534016 A | 10/2002 |

OTHER PUBLICATIONS

Japanese Office Action dated Dec. 8, 2010, issued in corresponding Japanese Patent Appication No. 2005-094489.

* cited by examiner

*Primary Examiner* — Syed A. Zia

(74) *Attorney, Agent, or Firm* — Westerman, Hattori, Daniels & Adrian, LLP

(57) ABSTRACT

The present invention provides a scrambled compressed data distribution device that can perform a high-resistance scrambled compressed data distribution by selectively using a plurality of types of scramble information and a playback device thereof.

A scrambling section scrambles compressed data by unique one of a plurality of scrambling methods. A hash value calculating section determines a hash value based on data b in a position where digital watermark data is not embedded, and an encrypting section encrypts the hash value with a secret key Sk(n) corresponding to the scrambling method and outputs an encrypted hash value c. A watermark data embedding section embeds the encrypted hash value in a watermark data embedding position of the data b and transmits the same as a compressed data stream d.

2 Claims, 2 Drawing Sheets

| ID (x) | Sk (x) : SECRET KEY | Pk (x) : PUBLIC KEY | SCRAMBLING METHOD |
|---|---|---|---|
| 1 | Sk (1) | Pk (1) | SCRAMBLE 1 |
| 2 | Sk (2) | Pk (2) | SCRAMBLE 2 |
| ... | ... | ... | ... |
| N | Sk (N) | Pk (N) | SCRAMBLE N |

COMPRESSED DATA SCRAMBLED DISTRIBUTION DEVICE AND PLAYBACK DEVICE THEREOF

BACKGROUND OF THE INVENTION

1. Field of the Invention

The present invention relates to a compressed data scrambled distribution device and a playback device controlled by a digital watermark thereof.

2. Description of the Related Art

Conventionally, methods for carrying out descrambling by use of digital watermark as key information have been proposed in the following Patent Documents 1 and 2, for example.

Patent Document 1 discloses a method for generating a locking key by use of separately sent copyright information, player-specific information, and digital watermark information and carrying out descrambling based thereon. In addition, Patent Document 2 discloses a method for applying descrambling to data when a trigger signal embedded in the form of a digital watermark exists and outputting without descrambling when the trigger signal does not exist.

[Patent Document 1] Japanese Published Unexamined Patent Application No. 2001-78007
[Patent Document 2] Japanese Published Unexamined Patent Application No. 2002-534016

However, in both of the techniques, only one scramble signal is used, and there is no assumption that a plurality of types of scramble signals are selectively used.

SUMMARY OF THE INVENTION

It is an object of the present invention to provide a scrambled compressed data distribution device that can perform a high-resistance scrambled compressed data distribution by selectively using a plurality of types of scramble signals and a playback device thereof. Also, it is another object to provide a compressed data scrambled distribution device that can generate compressed data scrambled distribution signals of a plurality of types of qualities and a playback device thereof.

In order to achieve the above-described object, the present invention has a first feature, in a compressed data scrambled distribution device, including a means for applying scrambling to compressed data by use of any one of a plurality of scrambling methods, and a means for embedding a signal to discriminate the used scrambling signal in the scrambled compressed data as digital watermark data, and has a second feature in that the digital watermark data is embedded after encryption.

Next, the present invention has a third feature, in a playback device, including a means for receiving compressed data distributed from the compressed data scrambled distribution device, a means for extracting digital watermark data from the received compressed data, and a means for determining a descrambling method based on the extracted digital watermark data and descrambling the received compressed data, and has a fourth feature in that it includes a means for decrypting the digital watermark data.

Furthermore, the present invention has a fifth feature in that a compressed data scrambled distribution and playback device composed of the compressed data scrambled distribution device and playback device is provided.

According to the present invention, since anyone of a plurality of scrambling methods is selected and scrambling is thereby applied to one piece of compressed data, a high-resistance compressed data scrambled distribution signal can be generated.

Moreover, since it is sufficient for the playback device to include a plurality of descrambling methods notified in advance, no special device is required and data can be played back even by a portable telephone.

Moreover, since a plurality of scrambles can be applied in stages to one piece of compressed data, when compressed data such as music data is distributed via a portable telephone, a network, or the like, it becomes easier to provide a user with the service and manage the same.

DETAILED DESCRIPTION OF THE PREFERRED EMBODIMENT

Hereinafter, the present invention will be described in detail with reference to the drawings.

Figures 3, 4:
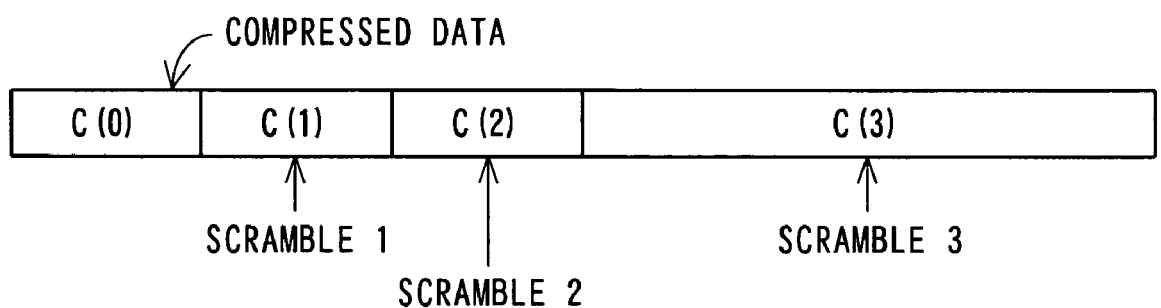
FIG. 3 is an explanatory drawing of N types (ID(1) to ID(N)) of scrambling methods and secret keys and public keys corresponding thereto.
FIG. 4 is an explanatory drawing when a plurality of scrambles is applied in stages to one piece of compressed data.

First, N types (ID(1) to ID(N)) of scrambling methods 1 to N as shown in FIG. 3 and secret keys and public keys corresponding thereto are prepared as a preliminary arrangement. Then, a compressed data scrambled distribution device (server) can selectively use the N types of scrambling methods to carry out scrambling. On the other hand, a playback device (client) thereof has descrambling methods and public keys based on the scrambling methods.

Figure 1:
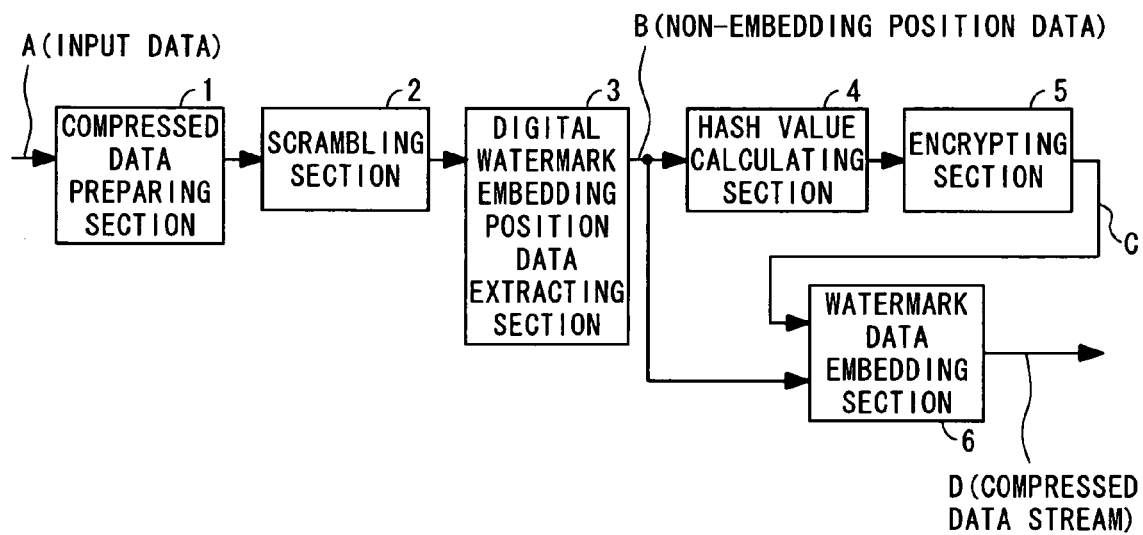
FIG. 1 is a block diagram showing a schematic configuration of a compressed data scrambled distribution device according to an embodiment of the present invention.

Next, a configuration and operations of a compressed data scrambled distribution device according to an embodiment of the present invention will be described with reference to a block diagram of FIG. 1.

A compressed data preparing section 1 compresses input data a, for example, music data, to prepare compressed data thereof. A scrambling section 2 scrambles the compressed data by any scrambling method of the ID(1) to ID(N). In the following, description will be given on the assumption that a scrambling method n corresponding to an ID(n) (here, $1 \leq n \leq N$) has been selected. A digital watermark embedding position data extracting section 3 extracts data in a position where digital watermark data is embedded. Data (non-embedding position data) b excluded data at the position where digital watermark data is embedded by the digital watermark embedding position data extracting section 3 is sent to a hash value calculating section 4, and a hash value is determined based on the non-embedding position data b. An encrypting section 5 encrypts the hash value with a secret key Sk(n) of the ID(n) and outputs an encrypted hash value c. A watermark data embedding section 6 embeds the encrypted hash value in a watermark data embedding position of the non-embedding position data b from the digital watermark embedding position data extracting section 3 and transmits the same as a compressed data stream d.

Here, it is preferable that the data in a position where digital watermark data is embedded is data at a part that has little influence on data quality and data to which scrambling is applied is data at a part that has influence on data quality.

Figure 2:
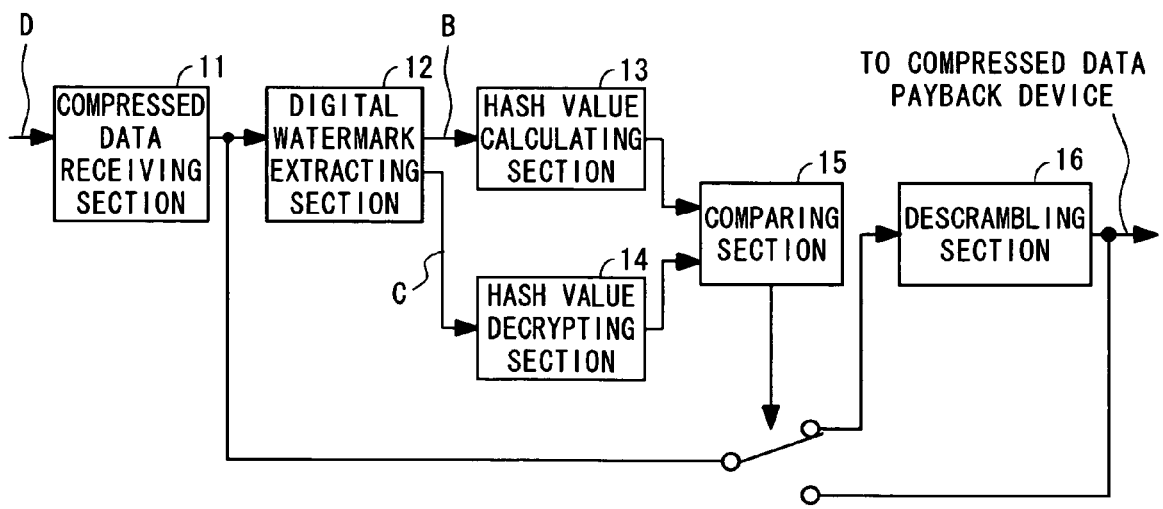
FIG. 2 is a block diagram showing a schematic configuration of a playback device according to an embodiment of the present invention.

Next, a configuration and operations of a playback device will be described with reference to FIG. 2.

A compressed data receiving section 11 receives the compressed data stream d transmitted from the compressed data scrambled distribution device. A digital watermark extracting section 12 extracts digital watermark data from the compressed data. Non-embedding position data b being residual data after extracting the digital watermark data is sent to a hash value calculating section 13, where a hash value is calculated based on the data b. On the other hand, a hash value decrypting section 14 decrypts an encrypted hash value extracted by the digital watermark extracting section 12 by use of all public keys Pk(1) to Pk(N) described above. Then, a comparing section 15 compares the hash values decrypted by use of the public keys Pk(1) to Pk(N) with the hash value determined by the hash value calculating section 13. If there is any coincident hash value as a result of this comparison, the compressed data received by the compressed data receiving section 11 is descrambled with a descrambling section 16 by a descrambling method corresponding to a public key Pk(n) used for encryption of that hash value. With regard to decryption of the hash value, at a stage where the decrypted hash value has coincided with the hash value determined by the hash value calculating section 13, decryption by use of other remaining pubic keys may be stopped.

The descrambled compressed data is sent to an unillustrated compressed data playback device and reproduced. On the other hand, when the data is altered in the middle of transmission or the like, it is judged in the comparing section 15 that no hash value coincident with the hash value determined by the hash value calculating section 13 is included in the hash values decrypted by use of the public keys Pk(1) to Pk(N), and the data is sent to the compressed data playback device without being descrambled or output of the data is abandoned.

As in the above, according to the present embodiment, since the compressed data scrambled distribution device can scramble compressed data by use of any method of the plurality of scrambling methods 1 to N, it becomes possible to generate a high-resistance compressed data scrambled distribution signal.

Next, by making the respective scramble strength of the plurality of scrambling methods 1 to N variable, for example, so that scramble gradually strengthens, when, for example, music data is provided for a user via a portable telephone, a network, or the like, a clear sound of music without scramble is first provided to allow the user listen to the music to find out whether he/she likes the music. Then, if the user wishes to listen to the music further, it is possible to worsen the music quality in stages for a user who has no playback function according to the present invention. On the other hand, a user who has the playback function according to the present invention can listen to a clear piece of music until the end.

Also, as another method, scramble strength is made to strengthen gradually from scramble 1 to scramble N, and for example, as shown in FIG. 4, operations such as providing a data part to which no scrambling is applied at an introduction part C(0) of compressed data such as music data, applying a weak scramble 1 to the following part C(1), applying a slightly strong scramble 2 to the following part C(2), and furthermore, applying the strongest scramble 3 to the following part C(3) can be carried out. This makes it possible, when, for example, music data is provided for a user via a portable telephone, a network, or the like, to provide a clear sound of music without scramble at the introduction part C(0) thereof and worsen the music quality in stages for the user who has no playback function according to the present invention as it progresses to the parts C(1), C(2), and C(3).

In the above-described embodiment, the N types (ID(1) to ID(N)) of scrambling methods shown in FIG. 3 and the secret keys and public keys corresponding thereto have been fixed, however, the present invention is not limited thereto and these can be made variable. These can be changed in a cycle such as daily or weekly, for example. This change must be notified in advance to the playback device.

The present invention is not limited to music data and can also be applied to video data or the like. For a higher secrecy, a public key certificate can be used and attached to data for transmission.

The inventor has already confirmed that when MPEG-1/2 Layer III (MP3) defined by ISO is used as compressed data, it is possible, in a portable terminal, to determine a predetermined descrambling method of a plurality of types of scrambles based on an embedded signal and descramble the compressed data in real time.

What is claimed is:

1. A distribution and playback device comprising:
 the distribution device including:
 a predetermined plurality of different scrambling methods;
 means for scrambling compressed data to produce scrambled compressed data by use of a selected one of the plurality of scrambling methods;
 means for extracting data (D) in a position where digital watermark is embedded from the scrambled compressed data;
 means for calculating a hash value based on a non-embedding position scrambled compressed data which do not include the data (D);
 means for encrypting the hash value with a secret key assigned to the selected one of the plurality of scrambling methods; and
 means for embedding the encrypted hash value at a watermark data embedding position in the scrambled compressed data;
 the playback device including:
 means for receiving the scrambled compressed data from the distribution device;
 means for extracting the digital watermark from the received scrambled compressed data;
 means for calculating a hash value based on a non-embedding position received scrambled compressed data which do not included the digital watermark;
 means for decrypting the encrypted hash value by use of all public keys assigned to the plurality of scrambling methods;
 means for determining a descrambling method by a coincident of the calculated hash value with the decrypted hash value; and
 means for descrambling the received scrambled compressed data with the descrambling method.

2. The distribution and playback device according to claim 1, wherein a strength of scrambling methods is changed step by step.

* * * * *